Figure 1:
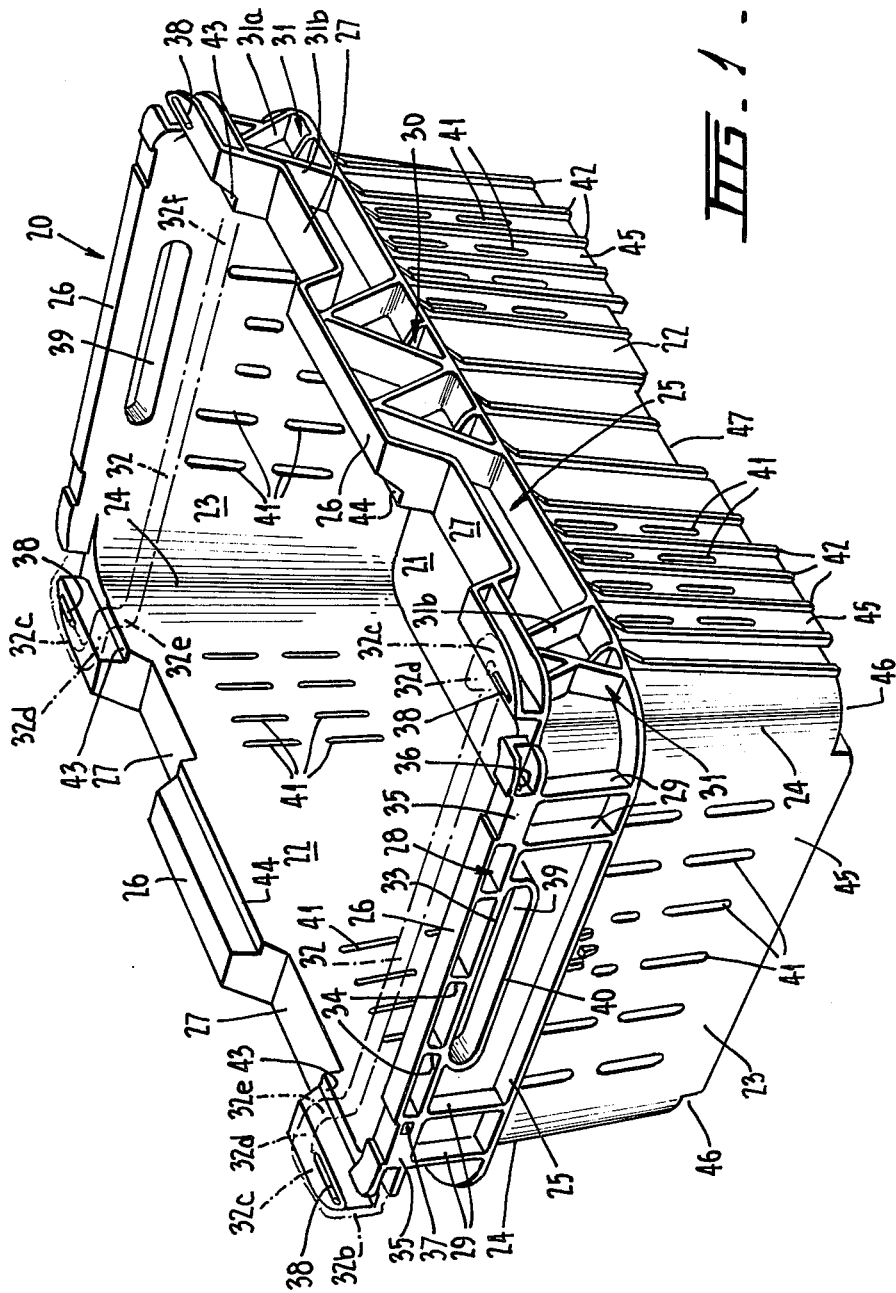

United States Patent [19]

Atkin et al.

[11] 4,105,117

[45] Aug. 8, 1978

[54] RE-USABLE PLASTIC CONTAINERS

[75] Inventors: Howard Dawson Atkin, Beaumaris; Zbigniew Henryk Stachurski, Heathmont; Brian Wilson Cherry, Glen Waverley, all of Australia

[73] Assignee: Plastic Enterprises Pty. Limited, Australia

[21] Appl. No.: 721,499

[22] Filed: Sep. 8, 1976

[30] Foreign Application Priority Data

Sep. 8, 1975 [AU] Australia .............................. 3080/75

[51] Int. Cl.² ........................................... B65D 21/06
[52] U.S. Cl. .................................. 206/501; 206/506; 220/23.4
[58] Field of Search ............... 206/506, 507, 501, 504; 220/95, 23.6

[56] References Cited

U.S. PATENT DOCUMENTS

| | | | |
|---|---|---|---|
| 2,105,179 | 1/1938 | Best | 206/506 |
| 2,489,470 | 11/1949 | Ullrich | 206/506 |
| 3,117,692 | 1/1964 | Carpenter | 206/501 |
| 3,323,673 | 6/1967 | Cowan | 206/506 |
| 3,375,953 | 4/1968 | Miller | 206/506 |
| 3,379,339 | 4/1968 | Asenbauer | 206/506 |
| 3,421,656 | 1/1969 | Asenbauer | 206/506 |
| 3,498,494 | 3/1970 | Voorhees | 206/501 |
| 3,659,743 | 7/1970 | Box | 206/506 |
| 3,951,265 | 4/1976 | Carroll | 206/506 |

FOREIGN PATENT DOCUMENTS 1,450,763 7/1966 France .................................. 206/506
1,378,353 12/1974 United Kingdom ..................... 206/506

Primary Examiner—George E. Lowrance
Attorney, Agent, or Firm—Murray & Whisenhunt

[57] ABSTRACT

A re-usable plastic container for the transportation and handling of articles such as fruit and vegetables, and having a base, two opposed side walls and two opposed end walls, all of which walls are inclined downwardly and inwardly to allow nesting of containers one within the other when necessary. The containers also have support wires pivotally mounted on the end walls of the container to be pivotable between positions hanging down alongside the respective end walls to allow another container to be nested therein, and a position overlying or bridging the tops of the ends of the container to support another container thereon in a stacked relationship. The container further includes an arrangement of reinforcing webs in the side walls beneath the points at which the support wires overlie or bridge the container walls, that is, at the position where the load of one or more containers stacked above will be applied, to assist in the support and distribution of the load. The container is formed from a plastics material of the type having a flexural modulus within the range of 200 to 2,000 megapascals as measured by ASTM.D. 790, and which upon removal of a load has the ability substantially to recover to within 5% of its original dimensions as determined by experimental measurement within an accuracy of ± 5%, after being subjected to a strain of at least 5%.

12 Claims, 10 Drawing Figures

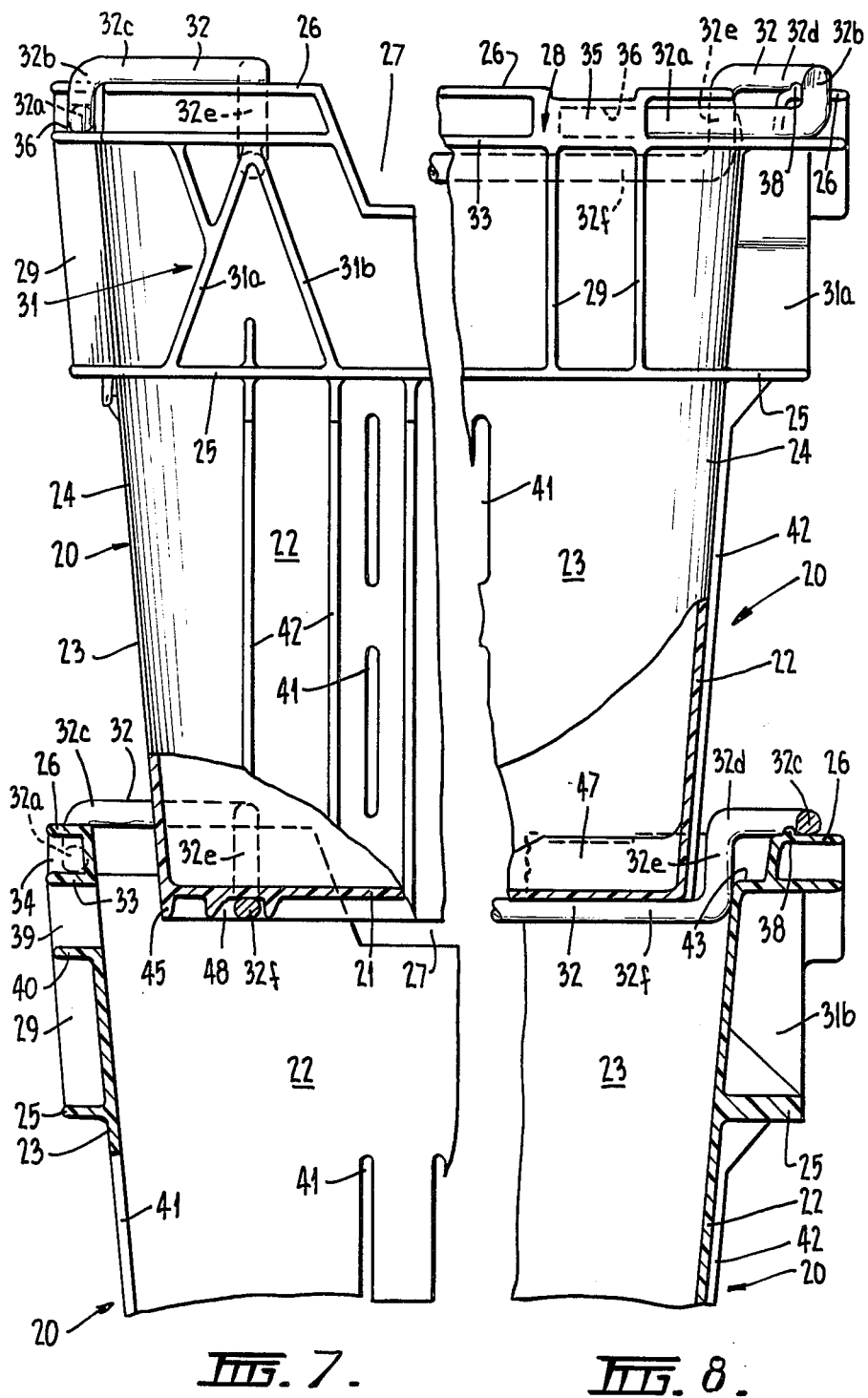

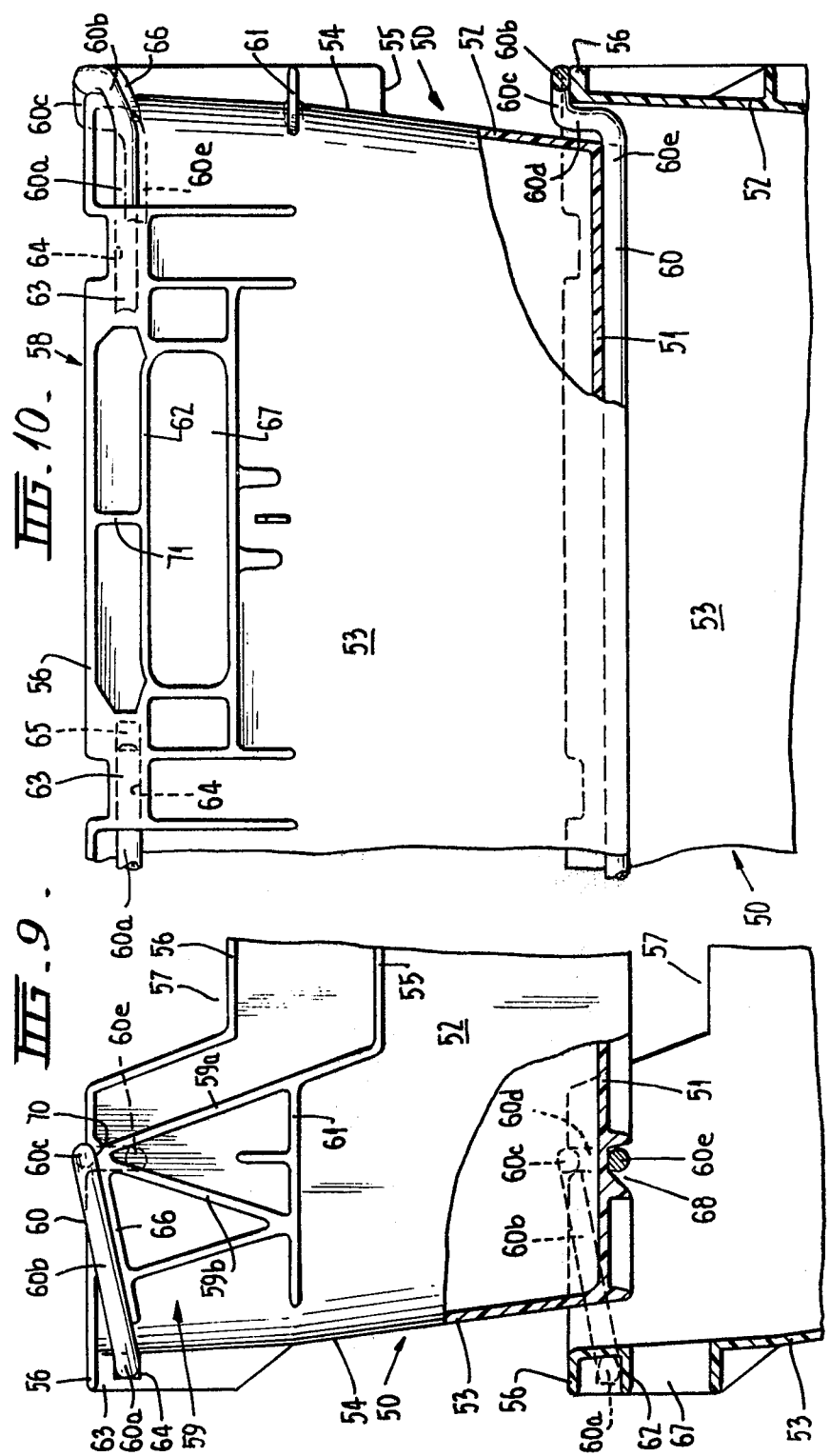

RE-USABLE PLASTIC CONTAINERS

This invention relates to improvements in reusable plastic containers, particularly, but not exclusively, containers used for the transportation and handling of perishable articles such as fruit and vegetables. The invention is also applicable to reusable plastic containers which are capable of both nesting and stacking.

Traditional methods of handling and packaging fruit and vegetables have led to a proliferation of containers variety of types, shapes and sizes. Containers presently in use include wooden boxes and crates, fibreboard cartons, jute sacks, netting bags and plastic bags, all involving various shapes and sizes. The efficient stacking and utilisation of storage space with such a variety of containers is extremely difficult, if not in some cases impossible.

The short-comings of traditional packaging methods, coupled with the pressure to reduce packaging costs, has led to the development of the present invention, which has resulted in the production of a re-usable plastic container which may be provided in a range of sizes, and which will allow the containers to be stacked one upon the other when containing contents for transportation or storage purposes, but which will also nest one within the other during transportation or storage in an empty condition.

It will be apparent that for a proportion of its life a container of the type to which the present invention relates will be subjected to relatively high loads, particularly when placed at, or close to, the bottom of a stack of containers containing produce where it needs to bear the total load of a plurality of upper containers and the produce therein.

It is therefore a primary object of the present invention to provide a re-usable container which has good load bearing characteristics when used repeatedly over a relatively long period of time.

The container preferably should have a life expectancy of five years based on a minimum of fifteen uses a year in the marketing system and all that this involves, such as, transportation in stacked or nested condition, cleaning, and storage, including cool storage, although it should be appreciated that life expectancy does vary with the number and frequency of uses and the care taken by personnel handling the containers.

One of the major features which influences the life expectancy of a container is the size and frequency of loads to which the container is subjected, particularly in a stacked condition. In this respect in a stacked condition a container is subjected to loads applied to the tops of the walls when one or more loads containers are placed on top, and this loading tends to deform the walls and care must be taken to ensure that when loaded containers are mounted one upon the other a margin of safety is provided against the possibility that the stack will collapse, whilst at the same time, the level of the produce within the container will need to be such as to prevent the base of the container above resting on and damaging the produce in the container below.

The most obvious solution to the problem is to manufacture the containers from materials having a high modulus of elasticity. Such materials usually have a high weight factor and/or are accompanied by poor corrosion characteristics which make them unsuitable, and often costly.

Plastic materials are the most satisfactory from the point of view of cost, weight and resistance to normal corrosive environments, but have the disadvantage that they tend to have a low modulus of elasticity. Therefore, with plastics materials it is conventional to design the container in such a manner as to ensure that the walls thereof substantially resist buckling or deformation under load, and that the loads are kept within predetermined design limits. The most common design technique used is to provide relatively thick walls and/or utilise a significant number of reinforcing webs on the walls, the net effect of which is to increase the amount of plastics material necessary and therefore both the weight and cost of the container.

However, it is known that a certain class of plastics materials which deform under load have the ability, up to a particular load value and within a particular period of time, substantially to recover their original shape and size after the load is removed. We have found that if these classes of plastics materials are utilised for containers of the type which form the subject of this invention, then the thickness of the walls of the container can be kept relatively low and/or the provision of strengthening webs can be kept to a minimum, by tolerating some deformation of the walls of the container when under load in view of the fact that upon removal of the load it can be expected that significant permanent deformation will not have occurred, and that the walls will substantially recover their orignal shape and size.

The invention therefore envisages a container defined by a base and at least one peripheral wall, wherein at least the, or each, peripheral wall, is formed from a plastics material of the type having a flexural modulus within the range of 200 to 2,000 megapascals as measured by ASTM.D. 790, and which upon removal of a load has the ability substantially to recover to within 5% of its original dimensions as determined by experimental measurements within an accuracy of ± 5%, after being subjected to a strain of at least 5%.

Any thermoplastic material falling within the above requirement is satisfactory for the present invention, although polypropylene, and more particularly the high impact copolymer type of polypropylene, has proved to be the most successful for the present invention. A typical example of a satisfactory polypropylene is that sold by the Shell Company under the designation GMT 6100, which has a flexural modulus of 1000 megapascals when measured by ASTM. D. 790.

Based on the utilisation of containers of the present invention as defined above, it is one preferred aspect of the present invention to provide containers of such sizes that, when brought together for transportation to form a module, the total size of the module will best utilise standard pallet sizes and standard truck tray widths, and we have found that a module size of 505 × 330 mm will optimise packing efficiency on an Australian standard pallet measuring 1170 × 1170 mm.

Preferably four standard volumetric capacity containers are used to meet the requirements of the fruit and vegetable industry, namely; an 1 liter capacity container for produce traditionally carried in ½ bushel boxes (e.g. tomatoes); a 36 liter capacity container for produce traditionally carried in 1 bushel boxes (a general purpose size providing for a wide range of fruit and vegetables); and 60 and 72 liter capacity containers to serve the needs of growers requiring larger containers for produce such as celery, cabbages, cauliflowers, pumpkins and others.

In order to be combined on a module basis for the standard pallet size, the 18 and 36 liter containers have effective perimeter dimensions of 505 × 330 mm, whereas the 60 and 72 liter containers have effective perimeter dimensions of 505 × 660 mm. For those containers having equivalent perimeter dimensions but larger volumetric capacity, the larger capacity is achieved by increasing the height of the container concerned.

Preferably the containers according to the present invention also incorporate features whereby they will stack and nest not only on, or in, containers of the same size, but also in such a way as to allow the stacking of small containers on larger containers and vice versa, whilst maintaining dynamic stack stability, that is, the ability of a stack of containers to remain stable when jolted during transportation over rough surfaces.

Preferably the portions of the walls of the containers upon which the loads of containers above in a stacked condition are applied incorporate a special web formation whereby the localised load may be effectively supported by, and distributed through, the wall material.

Figure 2:
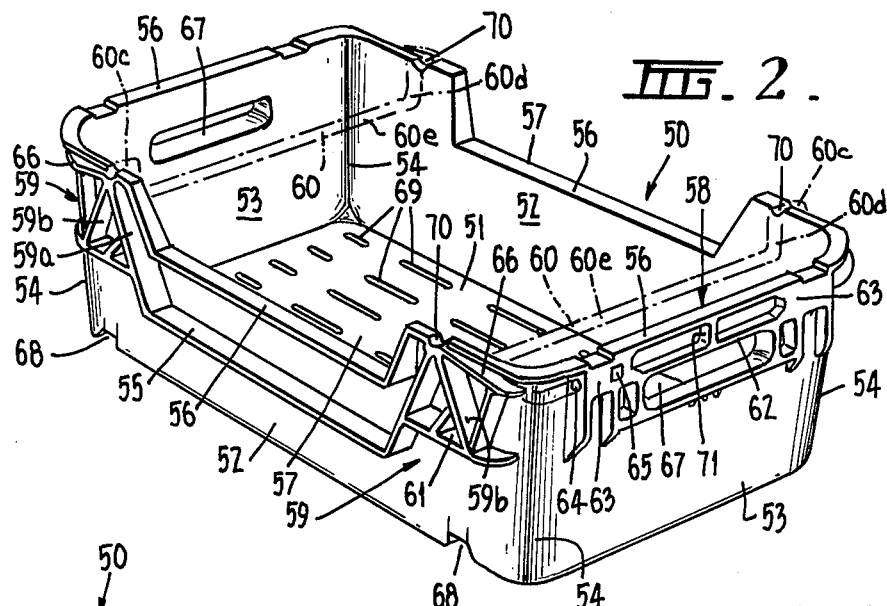
Figure 5:
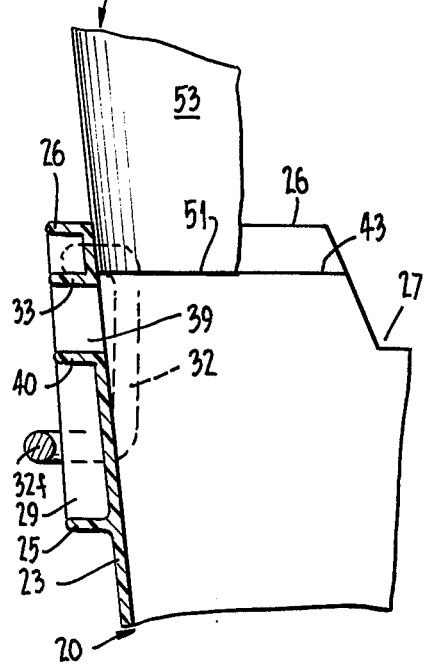
Figure 6:
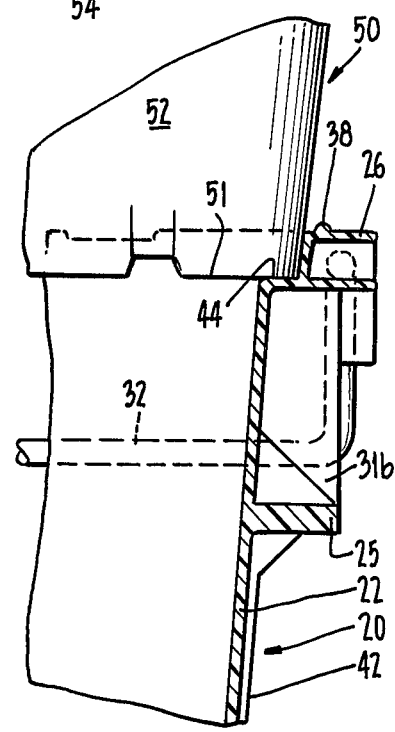
Figure 3:
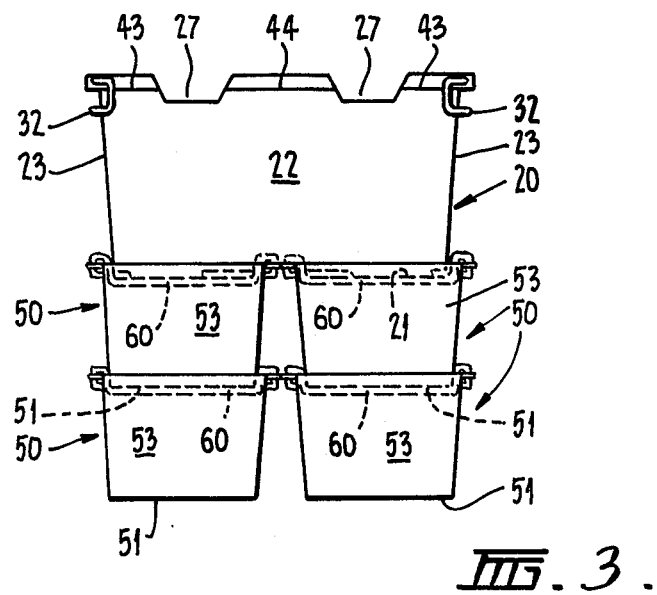
Figure 4:
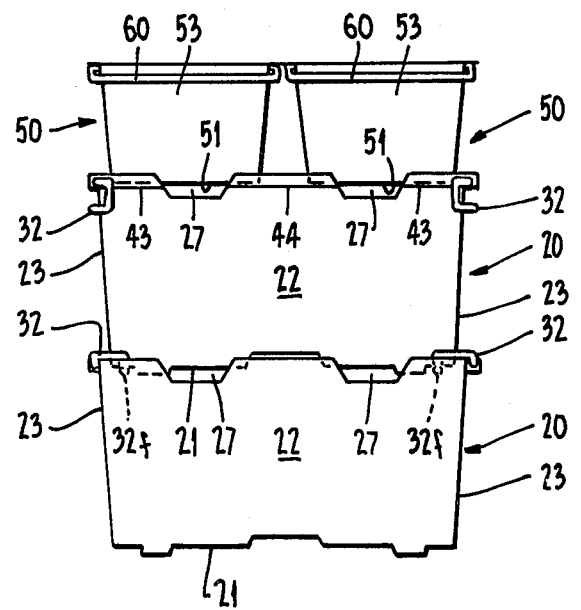

Two preferred embodiments of the present invention will now be described with reference to the accompanying drawings in which:

FIG. 1 is a perspective view of a relatively large container (60 or 72 liter capacity) incorporating the present invention, FIG. 2 is a perspective view of a small container (18 or 36 liter capacity) also incorporating the present invention, FIG. 3 is a side elevational view of a stack of containers involving an arrangement of both small and large containers of the type shown in FIGS. 1 and 2, FIG. 4 is a side elevational view of a stack of containers incorporating an alternative arrangement of small and large containers of the type shown in FIGS. 1 and 2, FIG. 5 is an enlarged side view partially in section illustrating the seating of the small container of FIG. 2 within the large container of FIG. 1, FIG. 6 is an enlarged end elevational view partly in section of the seating of the small container within the large container as shown in FIG. 5, FIG. 7 is a side elevational view partially in section of the seating of the large container of the type shown in FIG. 1 within a similar large container in a stacked position, FIG. 8 is an end elevational view partly in section of the seating of the large container within a similar large container, FIG. 9 is a side elevational view partly in section of the seating of a small container within a similar small container in a stacked condition, and FIG. 10 is an end elevational view partly in section of the arrangement of containers as shown in FIG. 9.

With reference to the first preferred form of the invention as incorporated in a large container construction, for example 60 or 72 liter capacity, and with reference to FIGS. 1, 7 and 8 of the drawings, the container is moulded from a high impact copolymer type of polypropylene and takes the form of a rectangular container generally indicated as 20, open at the top and having a base 21, two opposed side walls 22 and two opposed end walls 23 interconnected by curved corner wall portions 24. The side, end and corner wall portions 22, 23 and 24 are all inclined downwardly and inwardly so that when the containers are empty they can be received or nested one within the other for transportation and/or storage, whilst in the stacked condition the base of an upper container on being positioned has peripheral dimensions less than the peripheral dimensions at the top of a similar container such as to allow it to sit within the upper opening of a lower container.

As shown the interior surface of the side, end and corner wall portions are all smooth and free from any projections which might cause damage to any contents, e.g. fruit or vegetable produce.

The upper wall portions of the container are strengthened by an arrangement of webs comprising a lower web 25 extending around the periphery of the container and an upper web or flange 26 coincident with the top edge of the container. As shown in FIG. 1. the top edges of the two side walls 22 have depressions 27 formed therein to allow an opening to be formed between the top of one container and the base of another container in a stack of containers through which opening air can circulate, whilst the opening further establishes the upper limit for packing of contents to ensure that in a stacked condition the base of a container above will not rest on the contents in the container below.

The top edges of the end walls 23 include wire support sections 28 to be later described and a pair of vertical webs 29 extend between the lower web 25 and the support section 28 on the end walls 23.

A central group 30 of angled webs is provided between the lower web 25 and the upper web or flange 26 approximately midway along the length of the side walls 22 of a container, whilst further arrangements of angled webs 31 are provided between the lower web 25 and the upper web or flange 26 on each side wall 22 and at a position adjacent each corner and the arrangement of the webs 31 is such as to support and distribute the loads applied to the side walls 22 when loaded by containers stacked above and supported on the support wires 32 (shown in dot-dash lines in FIG. 1 to enable the structure beneath to be clearly shown). The support wires 32 rest on the upper edges of portions of the side walls adjacent to the corners. In practice each group of webs 31 includes at least two upwardly converging webs 31a and 31b the point of intersection of which is substantially directly beneath the point at which the respective support wire 32 passes transversely onto the top edge of the wall.

Each wire support section 28 comprises an intermediate flange 33 spaced slightly downwardly from, and parallel to, the upper flange 26 on the upper edge of the end wall 23, and a plurality of short webs 34 interconnect the flanges 26 and 33. At each end of the wire support section 28 adjacent the respective corners of the container support wire engaging block portions 35 are incorporated having holes 36 therein for hingedly receiving the ends of the support wire 32. The hole 36 at one end is longer than that at the other end thus allowing one end of the support wire to be over-inserted a distance sufficient to allow the opposite end to be aligned and moved into the other hole. Once the support wire is in position in both holes, the slack left by the greater length of the first hole is removed by inserting a filler block into an aperture 37 aligned with the inner end of the longer hole 36 and being retained therein by press fitting or glueing, whereby the support wire will be held against any significant degree of movement within its support 28 and therefore laterally of the container.

Each support wire includes straight hinge portions 32a for receipt in the holes 36 as just described, curving into an upwardly directed portions 32b, which in turn curve into a longitudinally directed intermediate portions 32c extending along the edge flanges 26 as shown, and subsequently curving into inwardly directed portions 32d which in turn curve downwardly into downwardly directed portions 32e and finally curved to form a straight support section 32f which extends across the width of the container and within the container in the position as shown and at a depth sufficient to retain relatively firmly any container stacked on top thereof, but not sufficient to allow the base of a container stacked on the wire, or the wire itself, to contact and damage any produce in the container.

As shown, the top flange 26 has small webs 38 formed thereon inwardly of the wire portions 32c, when the support wires are in position shown in FIG. 1, such that when a load is applied the tendency for the upper portions of side wall 22 to move outwards is substantially prevented due to the interaction between the wire portions 32c and the webs 38 which assists in resisting the outward movement of the upper portions of the walls 22.

As shown, each end wall 23 has a slotted aperture 39 therethrough which forms a lifting handle adjacent the top edge of the end wall beneath the wire support sections 28 and incorporates a flange 40 thereabout to provide a firm and strong gripping edge. The side walls 22 and end walls 23 all include elongated slots 41 therethrough as shown to allow for circulation of air through the container and around the contents therein and to keep the amount of material to a minimum. The side wall 22 also includes vertical webs or ribs 42 extending from adjacent the base of the container up to the lower peripherally extending web 25 to strengthen further the relatively longer side walls 22.

Within the container, adjacent the upper edges of the side walls 22, a series of aligned shelf portions are formed comprising end shelves 43 and central shelves 44. These shelves provide support for small containers of the type to be later described when stacked on top of the large containers of this embodiment in a manner which will also be later described.

The peripheral walls 22 and 23 have lower extension webs 45 which have the effect of raising the base 20 of the container slightly above any level supporting surface. The undersurface of the base may have longitudinally and transversely extending webs or ribs formed therein, but corner access openings 46 are provided with the corner access openings 46 at each respective end of the container being connected by channels 48 (see FIG. 7) across underside of the base of the container within which the support wires of a lower container are received when containers are stacked one upon the other.

Furthermore, a relatively wide access channel or opening extends across the base of the container from positions midway along the side walls and the entrances at each side to the channel are indicated as 47.

As will be evident, particularly from FIG. 7 of the drawings, immediately below the point at which the support wire portion 32d crosses the upper edge flange 26, the web arrangement 31 incorporates a pair of upwardly converging webs 31a and 31b which intersect immediately beneath the point of contact of the support wire 32 and the flange 26 to allow the distribution of load, applied from above via the support wires, into the wall material at spaced apart points on the lower web 25. Such a web arrangement has proven to be particularly successful in supporting and distributing the load forces at these points.

With reference to the second preferred form of the invention as incorporated in a smaller capacity container, for example, 18 and 36 liter sized containers, and with reference to FIGS. 2, 9 and 10 in particular, as with the first embodiment the container is moulded from a high impact copolymer type of polypropylene, and takes the form of a rectangular container generally indicated as 50, open at the top and having a base 51, two opposed side walls 52 and two opposed end walls 53 interconnected by curved corner wall portions 54. The side, end and corner wall portions 52, 53 and 54 are all inclined downwardly and inwardly so that when the containers are empty they can be received or nested one within the other for transportation and/or storage, whilst when in a stacked condition the base of an upper container in having a peripheral dimension less than the peripheral dimensions at the top of a lower container will sit within the upper opening of the lower container and rest on the support wires to be later described.

As shown the interior surfaces of the side, end and corner wall portions are all smooth and free from any projections which might cause damage to any contents, e.g. fruit and vegetable produce.

The upper portions of the side walls 52 have an arrangement of webs comprising a lower web 55 and an upper web or flange 56 on the upper edge of the container, and in fact extending around the entire periphery of the upper edge as shown.

The top edges of the side walls 52 have relatively deep depressions 57 formed therein to allow the provision of an opening between the top of one container and the bottom of another container in a stack of containers through which air can circulate, whilst further establishing the upper limit for packing of contents to ensure that in a stacked condition the base of an upper container will not rest on the contents in the container below.

The top edges of the end wall 53 include a wire support section 58 to be later described. Arrangements of angled web groups 59 on each side wall 52 are positioned adjacent each corner and the arrangement of web groups 59 are designed to support and distribute the loads applied to the side walls 52 when loaded by containers stacked above and supported on the support wire 60. In particular, each web group 59 includes at least two upwardly converging webs 59a and 59b the point of intersection of which is substantially directly beneath the point at which the respective support wire 60 passes transversely onto the top edge of the wall. As shown, web 59a extends from the end of the web 55, whilst an intermediate web 61 supports the lower end of the web 59b.

Each wire support section 58 comprises an intermediate flange or web 62 spaced slightly downwardly from, and parallel to, the upper flange 56 on the upper edge of the end wall 53, and a short rib or web 71 interconnects the flanges 56 and 62 whilst support wire engaging blocks 63 interconnnect the ends of the flanges 56 and 62 and have holes 64 therein for hingedly receiving the ends of the support wire 60. The hole 64 at one end is longer than that at the other allowing one end of the support wire to be over-inserted a distance sufficient to allow the opposite end to be aligned and moved into the other hole. Once the support wire is in position in both holes, the slack left by the greater length of the first hole is removed by inserting a filler block into an aperture 65 aligned with the inner end of the larger hole 64 and is retained therein by press fitting or glueing, whereby the support wire is held against any significant degree of movement within its support section 58, and therefore laterally of the container.

Each support wire 60 includes straight attachment or hinge portions 60a for receipt in the holes 64 as just described, curving into intermediate portions 60b adapted to lie, in one position of the wire as illustrated, on inclined shelves, webs or flanges 66, after which it curves into an inwardly directed portions 60c, downwardly directed portions 60d and a straight support portion 60e extending transversely across the container as shown. The depth of the portion 60e is sufficient to retain relatively firmly any containers stacked on top thereof, whilst not sufficient to contact and damage any produce in the container itself. As shown the top edge of the container adjacent the inclined shelf 66 achieves the same objective as the small webs 38 in the first embodiment, in that, when the walls are loaded the tendency of the upper portions of the side walls 52 to move outwards is prevented by the interaction of the support wire portions 60b and the adjacent top edge of the wall.

As shown each end wall 53 has a slotted aperture 67 therethrough which forms a lifting handle adjacent the top thereof beneath the wire support sections 58.

The peripheral walls 52 and 53 have lower extension webs or ribs which have the effect of raising the base 51 of the containers slightly above a level supporting surface. The undersurface of the base may have longitudinally and laterally extending ribs or webs formed thereon, but access channels are provided between bottom openings 68, which openings are provided at a position corresponding to that of the support portion 60e of the support wire 60 such that when containers of this size are stacked one upon the other the bottom access channels assist in locating and retaining each upper container in position on the support wires of the lower container. The base of the container includes a plurality of slotted openings 69 to allow for circulation of air through the container and around the contents of the container. As shown the upper edges of the side walls, at the positions where the portions 60c of the support wires 60 cross, have grooves 70 therein to assist in locating and supporting the support wires.

As will be evident, particularly from FIG. 9 of the drawings, immediately beneath the groove 70 at which point the load, via the support wire, is imposed on the side walls 52, the web arrangement incorporates at least a pair of upwardly converging webs 59a and 59b which intersect immediately beneath the groove 70 to allow the distribution of loads applied from above on the support wire 60. Such an arrangement, as with the first embodiment of the present invention, has proven to be particularly successful in supporting and distributing the load forces imposed at these points in a stack of containers.

Containers of the embodiment of FIGS. 2, 7 and 8 may be nested one within the other, or when filled with produce, stacked one upon the other, for example, as represented by the two lower containers in FIG. 4 of the drawings. In order to nest the containers, the support wires 32 are swung to a position hanging down alongside the end walls 23, and the containers then inserted one within the other in groups, in which condition they may be transported or stored when not carrying produce. In a stack of containers as shown in FIG. 4, and referring particularly to FIGS. 7 and 8, the supporting wires 32 are swung into a supporting position bridging the container walls at the opposite ends thereof as shown in the drawings. As shown in FIGS. 7 and 8, one container is merely stacked or positioned on top of a lower container by resting the base 21 of the upper container on the support wires 32 of the lower container and more particularly in a position whereby the support wires 32 are received within the channels 48 extending across the base of the upper container as shown in FIG. 7, which serves to locate and substantially retain the upper container against movement longitudinally of the lower container. As will be evident from FIG. 8 of the drawings, the upper container is substantially retained against side ways or lateral movement on the lower container in view of the close proximity between the lower portions of the side walls 22 and the downwardly extending portions 32e of the support wires 32.

As discussed previously, the weight of one or more loaded containers above a lower container in a stack of such containers, will tend to deform the side walls 22 outwardly, although initially with lighter loads a degree of deformation can be prevented by the interaction between the portions 32c of the support wires and the relatively small webs 38 on the top flange 36 of the side walls as shown in FIG. 8. However, in accordance with the spirit of the invention, even with heavier loads where more deformation does occur, some deformation can be tolerated provided the load and the time for which it is applied is not so high as permanently to deform the wall material (e.g. due to non recoverable creep), and such that the wall material will have the opportunity to recover after the load is removed. Furthermore, the load on the wall material should not be of such a magnitude as to deform the side walls to the extent that the base of an upper container will rest on, and damage, the contents in the lower deformed container.

Containers of the embodiment of FIGS. 2, 9 and 10, may also be nested one within the other, or when full with produce stacked one upon the other, for example, as represented by the lower two groups of containers in FIG. 3 of the drawings. As with the first embodiment the containers may be nested by swinging the support wires 60 to a position hanging down alongside the end walls 53 of the container and inserting containers into each other in groups. In a stack of containers as shown in FIG. 3, and more particularly with reference to FIGS. 9 and 10 of the drawings, the supporting wires 60 are swung into a supporting position bridging the top edges of the container walls at the opposite ends thereof. As shown in FIGS. 9 and 10, one container is merely stacked or positioned on top of the lower container by resting the base 51 of the upper container on the support wires 60 of the lower container, and more particularly in a position whereby the support wires 60 of the lower container are received within the channels beneath the base and linking the openings 68 as shown in FIG. 9 which locate and substantially retain the upper container against longitudinal movement relative to the lower container in the stacked condition. As will be evident from FIG. 10 of the drawings the upper container is substantially retained against side ways or lateral movement on the lower container in view of the close proximity between the lower portions of the side walls 52 and the downwardly extending portion 60d of the support wire 60.

As discussed previously, the weight of one or more loaded containers above a lower container in a stack of containers will tend to deform the side walls 52 outwardly. Initially some degree of deformation can be prevented by the interaction between the intermediate wire portions 60b and the portion of the top edges of the side walls above the inclined shelves 66 as shown in FIGS. 9 and 10. However, as is the spirit of the present invention, heavier loads whereby more deformation may occur can be tolerated provided the load, and the time for which it is applied is not so high as to permanently deform the wall material, and is also not of such a magnitude as to deform the side walls to the extent that the base of an upper container will rest on and damage the contents in the lower deformed container. As is the spirit of the invention, the fact that the deformation is not permanent, allows the container side walls to recover after any load thereon is removed.

In both embodiments the loads are normally applied adjacent the corners of the containers due to the positioning of the support wires, as the corners of the containers are better able to support loads with little deformation, whilst the inclusion of the groups of angled webs at the corners, particularly beneath the point of application of the support wires on the side wall portions, provides further support for, and distribution of, the load.

As will be evident from a consideration of FIGS. 3, 4, 5 and 6 of the drawings, the two container sizes according to the two embodiments of the invention as described are designed so as to allow nesting, not only for containers of the same size (identical base dimensions) as described above, but also to allow for the production of stacks utilising containers of both sizes.

As shown in FIG. 3 of the drawings the groups of small containers 50 are stacked side by side as shown and in a manner as previously described, and in this arrangement a larger container 20 is placed on top and bridges the two lower containers. As shown in FIG. 3, the support wires 60 of the top two small containers 50 are swung to a position bridging the tops of the respective containers whilst the large container 20 is positioned with the support wire 60 received and retained under the side edges of the container, whilst the two adjacent top edges of the two small containers are received and retained within the relatively large central channel 47 crossing beneath the base of the large container thus providing a relatively secure and stable stack of containers of both sizes.

As shown in FIG. 4, particularly with reference to FIGS. 5 and 6, small containers 60 can be stacked on top of one or more lower large containers 20 by merely swinging the support wires 32 of the upper of the large containers to positions hanging down alongside the end walls of the containers and positioning the two small containers 60 within the upper portion of the large container by resting the base of one of the small containers on the two opposed end shelves 43 and opposed portions of the central shelves 44 within the top of the large container, whilst the other small container, for support, shares the remainder of the opposed portions of the central shelves 44 and rests on the end shelves 43 at the opposite end of the container 20, thus providing for secure and stable support of the small containers within the large container.

It will be apparent that any arrangement of containers of the two sizes can be facilitated according to the requirements for loading, transportation, and/or storage.

As also discussed previously, the sizes of the containers, particularly the peripheral dimensions are such that in combination they form layers which can be stacked one upon each other to allow ready adaption to use with standard pallet sizes.

We claim:

1. A container defined by a base, two opposed side walls and two opposed end walls, and having an upper opening therein, at least said walls formed from a plastics material of the type having a flexural modulus within the range of 200 to 2,000 megapascals as measured by ASTM.D. 790, and which upon removal of a load has the ability substantially to recover to within 5% of its original dimensions as determined by experimental measurement within an accuracy of ± 5%, after being subjecting to a strain of at least 5%, said container including support means to support at least one further container within said upper opening to form a stack of containers, said support means comprising support wires positioned at opposite ends of the container and adapted to rest upon substantially horizontal upper flanges at or near the upper edges of said side walls to overlie or bridge the end portions of said opposed side walls, and force transfer means for transferring forces from said upper flange to a lower flange of said container side wall to distribute said forces over a wider area of said container walls, each said force transfer means comprising strengthening web groups adjacent the portions wherein said support wires rest upon said upper flanges, each said web group extending upwardly from said lower flange and including at least two upwardly converging webs the point of intersection of which is below or substantially below and adjacent the point where the respective support wire rests upon the respective upper flange.

2. A container as claimed in claim 1, wherein each side or end, peripheral wall is a downwardly and inwardly inclining wall to allow containers to be nested within each other.

3. A container as claimed in claim 1, wherein said support wires are pivotally mounted on the opposed end walls of the container to be swung between bridging positions for stacking purposes, and positions lying down alongside the end wall of the container for nesting purposes.

4. A container as claimed in claim 3, wherein said support wires have downwardly directed portions adjacent the inside of each opposed side wall, which downwardly directed portions are interconnected by a support portion, and wherein the length of said support portion between said downwardly extended portions is slightly greater than the width of the base of a container, whereby when one container is positioned on top of a lower container in a stack of containers, the lower side wall portions of the upper container will be in close proximity to the downwardly extended portions of the support wires for the lower container to locate and substantially retain said upper container against movement laterally of the lower container.

5. A container as claimed in claim 1, wherein the base of the container includes transversely extending channels adapted to receive the support wires of a lower container in a stack of containers to locate and substantially retain an upper container against movement lengthwise of the lower container.

6. A container as claimed in claim 4, wherein said support wires include hinge portions adapted to be received within wire support sections on the respective end walls of the container, intermediate wire portions interconnecting said hinge portions and said downwardly directed wire portions, and extending along the upper edges of the side walls of the container adjacent the ends thereof.

7. A container as claimed in claim 6, wherein said hinge portions are connected to said intermediate wire portions by short wire portions to allow said intermediate wire portions to extend along substantially horizontal upper edges of said side walls in one position of said support wires, and said upper edges of said side walls include raised webs provided on the tops of said side walls and positioned inwardly of said intermediate wire portions whereby when load is applied to said side walls through said support wires the interaction of said webs and said intermediate wire portions serves to resist deformation or outward movement of the upper portions of said side walls.

8. A container as claimed in claim 6, wherein said intermediate wire portions are connected directly to said hinge portions whereby in one position of said support wire the intermediate portions extend along upwardly inclined support shelves or flanges adjacent the outside of the upper edge of said side walls and the interaction between the inner upper edges of said side walls and said intermediate wire portions act to resist outward movement of the upper portions of the side walls when said side walls are loaded via said support wires.

9. A container as claimed in claim 6, wherein said hinge portions of said support wires are received within laterally extending holes in the support sections adjacent the upper edges of said end walls, one of which holes is longer than the other to allow initial over insertion of the respective hinge portion therein to allow subsequent alignment and receipt of the hinge portion at the other end of said wire, and whereafter said support wire is retained laterally in position by insertion of a filler block into an aperture aligned with the inner end of said longer hole.

10. A container as claimed in claim 1, wherein the inside of the container adjacent the upper edges of the side walls thereof is provided with ledge portions to enable a small container to be supported and retained in position in a large container when a small container is supported thereon in a stack of containers.

11. A container system, including at least two of the containers of claim 1, the peripheral dimensions of which are such as when said containers are placed side by side they form a module of containers the total peripheral dimension of which substantially coincides with the dimensions of a standard transportation pallet.

12. A container system as claimed in claim 1, including at least two container sizes the peripheral dimensions of which enable two small containers to be stacked on one large container and vice versa.

* * * * *